United States Patent
Bugaj

(10) Patent No.: US 7,580,986 B2
(45) Date of Patent: Aug. 25, 2009

(54) DEPENDENCY GRAPH-BASED AGGREGATE ASSET STATUS REPORTING METHODS AND APPARATUS

(75) Inventor: Stephan Vladimir Bugaj, San Pablo, CA (US)

(73) Assignee: Pixar, Emeryville, CA (US)

( * ) Notice: Subject to any disclaimer, the term of this patent is extended or adjusted under 35 U.S.C. 154(b) by 1248 days.

(21) Appl. No.: 10/947,074

(22) Filed: Sep. 21, 2004

(65) Prior Publication Data

US 2006/0010153 A1     Jan. 12, 2006

Related U.S. Application Data

(60) Provisional application No. 60/572,230, filed on May 17, 2004.

(51) Int. Cl.
*G06F 13/00* (2006.01)
(52) U.S. Cl. .............. 709/214; 709/226; 707/104.1
(58) Field of Classification Search ................ 709/213, 709/214, 215, 216, 223, 226; 707/10, 104.1
See application file for complete search history.

(56) References Cited

U.S. PATENT DOCUMENTS

| 4,845,744 | A | 7/1989 | DeBenedictis |
| 6,278,466 | B1 | 8/2001 | Chen |
| 6,356,902 | B1 * | 3/2002 | Tan et al. ............. 707/10 |
| 6,573,898 | B1 | 6/2003 | Mathur et al. |
| 7,200,654 | B2 | 4/2007 | Koh et al. |
| 2003/0065635 | A1 | 4/2003 | Sahami et al. |
| 2003/0172138 | A1 * | 9/2003 | McCormack et al. ....... 709/220 |
| 2004/0024573 | A1 * | 2/2004 | Allen et al. ............... 702/189 |

OTHER PUBLICATIONS

Cook et al., "The Reyes Image Rendering Architecture", Computer Graphics, vol. 21, No. 4, 1987, pp. 95-102.
International Search Report PCT/US05/02973.

* cited by examiner

*Primary Examiner*—Viet Vu
(74) *Attorney, Agent, or Firm*—Townsend and Townsend and Crew LLP

(57) ABSTRACT

A method for a computer system includes determining a dependency graph for a user-selected aggregate asset comprising a plurality of nodes, determining node types for the plurality of nodes, when a first node of the plurality of nodes comprises a file-level asset node, the method includes determining first status data associated with the first node, when a second node of the plurality of nodes comprises an aggregate asset node, the method includes determining a plurality of file-level asset nodes that are children nodes of the aggregate asset node, and determining status data associated with each of the plurality of file-level asset nodes, aggregating the first status data and the status data associated with the plurality of file-level asset nodes to form status data for the aggregate asset for the user.

20 Claims, 6 Drawing Sheets

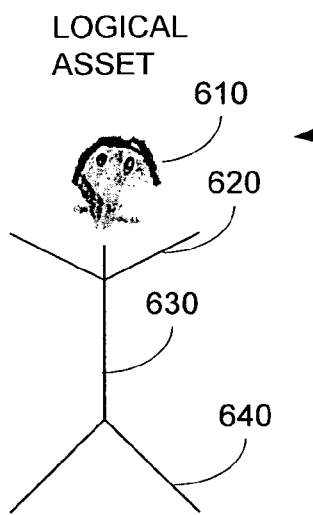
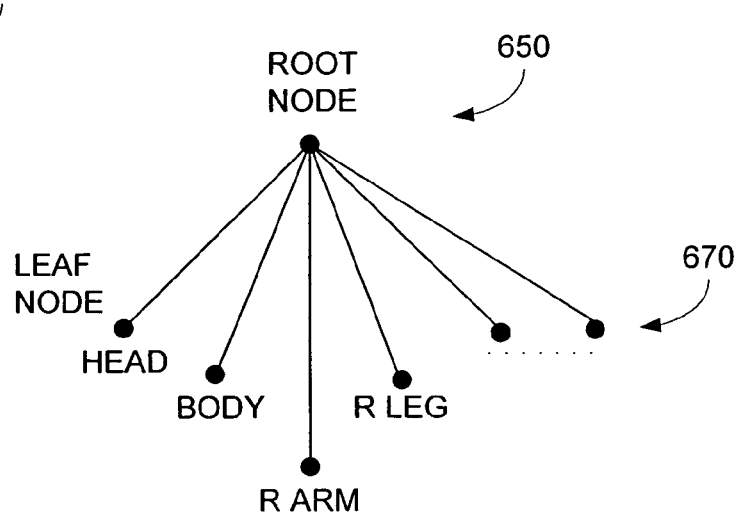
FIG. 5A  FIG. 5B
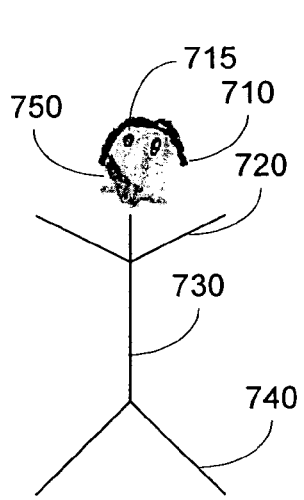
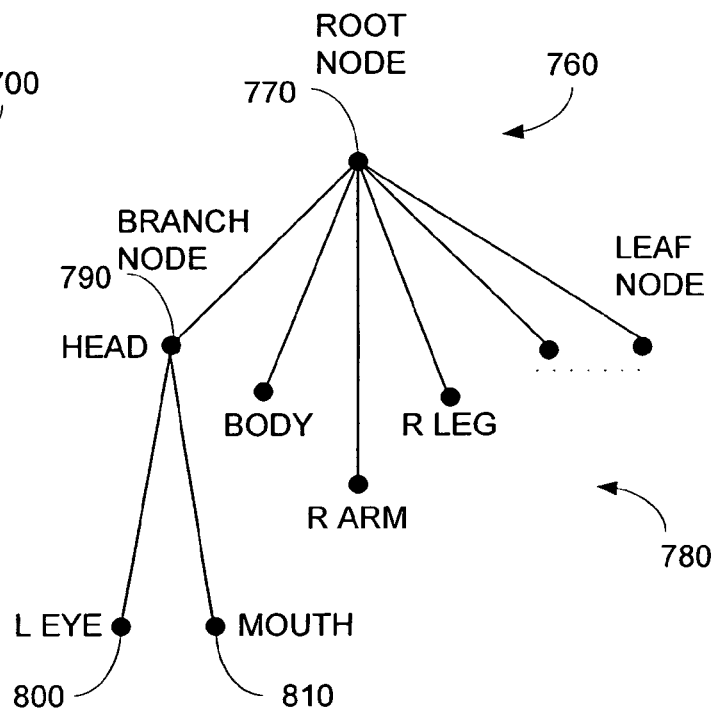
FIG. 6A  FIG. 6B

DEPENDENCY GRAPH-BASED AGGREGATE ASSET STATUS REPORTING METHODS AND APPARATUS

CROSS-REFERENCES TO RELATED APPLICATIONS

The present application incorporates by reference for all purposes and claims priority to Provisional Application No. 60/572,230, filed May 17, 2004. The present application also incorporates by reference for all purposes patent application Ser. No. 10/810,487, filed Mar. 26, 2004.

BACKGROUND OF THE INVENTION

The present invention relates to asset management systems. More particularly, the present invention relates to methods and apparatus for determining and displaying the change status of a complex asset. The status data may be used for a variety of purposes including asset tracking and/or asset management troubleshooting.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar, dba Pixar Animation Studios. Over the years, Pixar developed and offered both computing platforms specially designed for CAA, and rendering software now known as RenderMan®. RenderMan® renders images based upon conceptual "software assets" including geometric scene descriptors including references to object models.

Typically, scenes to be rendered are specified (assembled) by one or more users (e.g. animators, lighters, etc.). These scenes include descriptions of the objects, camera angles, lighting sources, and the like. Once a scene is defined, the scene data stored and/or the scene is rendered. The resulting image is then viewed by users (e.g. animators, shaders). If the users (e.g. animators, lighters) do not like the appearance of the rendered image, the users re-specify the scene data and the process repeats. Typically, there are a great number of objects in a typical scene, each typically having a great number of parameters that are set by different users.

The scene data file (also known as a scene descriptor file) that describes the entire scene is typically very large, on the order of gigabytes. Because the sizes of typical scene descriptor files are typically large, Pixar developed an internal technique for segmenting a scene descriptor file from one large file into a series of smaller files. As described in the co-pending application described above, Pixar developed and used the concept of "hook set" files and references to "hook files" to describe a scene. Other types of scene descriptors are contemplated for other environments, such as for Maya, or the like.

The inventors of the present invention have determined that a scene may be rendered and re-rendered by different users for a variety of reasons. Some reasons include to match changes in other scenes, to study the effect of different changes in lighting, texture, object placement, and the like. The inventors have also determined that it is important to users to know how a conceptual software asset, such as a scene, may have changed since the last rendering. For example, light objects may have been added to a scene, three-dimensional objects may be deleted from a scene, a camera object may have been repositioned, and the like. Additionally, the inventors have determined that it is important to know when and who made changes to a scene in the case an updated object causes problems during a re-render.

Some previous techniques for trouble shooting an asset management system to locate problem assets have included having a knowledgeable user manually determining and examining likely candidate assets to find the problem asset. Drawbacks to this approach included that such searches are time consuming for even the most expert user, for a sufficiently complex asset. Additionally, it required a user to have expertise in areas potentially outside their specialization, so the user could navigate parts of complex assets.

Other techniques included the use of version control system tools. Such tools typically report on the status of files under their management. A drawback includes that the views on the data are typically based on the on-disk structure of the file-level assets. This drawback contrasts with the inventors' desire that an asset status reporting system be rooted in a conceptual, aggregate asset like a "character" or a "shot", and not just a physical file, or the like. Another drawback is that the status of any files that are not checked into the version control system (accidentally or deliberately) are not properly reported.

Accordingly what is desired are improved methods and apparatus for asset reporting, without the drawbacks described above.

BRIEF SUMMARY OF THE INVENTION

The present invention relates to asset management. More specifically, the present invention relates to methods and apparatus for asset reporting. In various embodiments, the asset status are derived from one or more dependency graphs.

Embodiments of the present invention form a dependency graph for storage of asset status. Based upon the dependency graph, the system reports the status of individual files and the status of aggregate assets. Further, the dependency graph is used to identify some or most of the related assets for an aggregate asset so they can be queried concurrently. Additionally, the information about "depended-upon sub-assets" is taken into account when querying the root asset.

With embodiments of the present invention, file level views are also supported, as a hierarchal tree by sub-type. Conventional filters and queries can also be used to determine specific information of the asset including, the user, modification time, asset type, type and/or weight of relationship the asset has to the root asset being queried, etc. By relying upon the dependency graph approach, the status of the whole aggregate asset (for example, a character), or any subset thereof (for example, all the character's shaders) can be determined.

Embodiments of the present invention, include at least several, separate innovations, including: determination of aggregate status for a production-level asset such as a character or shot based on the direct version modification status (e.g. provided by a change isolation or version control system) and based on mining of status information of sub-assets. In embodiments of the present invention, other production-level assets may be queried for status, including shaders, lighting, texture, and the like.

Another innovation includes the relevance-weighted result filtering of sub-assets. Yet another innovation is the collection of multiply-rooted assets into an asset tree, rooted singly at the main asset queried. In various embodiments, this takes into account relationships by structure and by reference.

According to one aspect of the invention, a method for a computer system is disclosed. One technique includes receiving selection of an aggregate asset from a user, determining a dependency graph for the aggregate asset comprising a plurality of nodes, and determining node types for the plurality of nodes. When a first node of the plurality of nodes comprises a file-level asset node, a method includes determining first status data associated with the first node. When a second node of the plurality of nodes comprises an aggregate asset node, a technique includes determining a plurality of file-level asset nodes that are children nodes of the aggregate asset node, and determining status data associated with each of the plurality of file-level asset nodes. Techniques may also include aggregating the first status data and the status data associated with the plurality of file-level asset nodes to form status data for the aggregate asset, and providing the status data for the aggregate asset to the user.

According to another aspect of the invention, a computer program product for a computer system display is disclosed. One computer program product includes code that directs the processor to receive a selection of an aggregate asset from a user, code that directs the processor to determine a dependency graph for the aggregate asset, wherein the dependency graph comprises a plurality of nodes, and code that directs the processor to determine whether nodes from the plurality of nodes are file-level nodes. Computer code also includes code that directs the processor to determine first status data associated with a first node, when the first node is a file-level node, and code that directs the processor to determine more than one file-level nodes associated with the first node, when the first node is not a file-level node. Additional code may include code that directs the processor to determine first status data associated with the first node in response to status data associated with the more than one file-level nodes, and code that directs the processor to provide the status data for the aggregate asset to the user in response to the first status data. The code typically resides on a tangible media such as an optical media, magnetic media, semiconductor media, and the like.

According to yet another aspect of the invention, a computer system is disclosed. One system includes a memory configured to store a representation of a logical asset, wherein the logical asset comprises a plurality of assets. A system may also include a processor coupled to the memory configured to receive selection of the logical asset from a user, wherein the processor is configured to determine a dependency graph for the logical asset comprising a plurality of nodes, wherein the processor is configured to determine node types for the plurality of nodes, wherein the processor is configured to determine first status data associated with a first node from the plurality of nodes when the first node is a file-level node, wherein the processor is configured to determine a plurality of file-level asset nodes for a second node from the plurality of nodes and configured to determine status data associated with each of the plurality of file-level asset nodes when the second node of the plurality of nodes is an aggregate asset node, wherein the processor is configured to aggregate the first status data and the status data associated with the plurality of file-level asset nodes to form status data for the logical asset, and wherein the processor is configured to provide the status data for the logical asset to the user.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 5A-B illustrate an example according to an embodiment of the present invention; and FIGS. 6A-B illustrate an example according to an embodiment of the present invention.

DETAILED DESCRIPTION OF THE INVENTION

Figure 1:
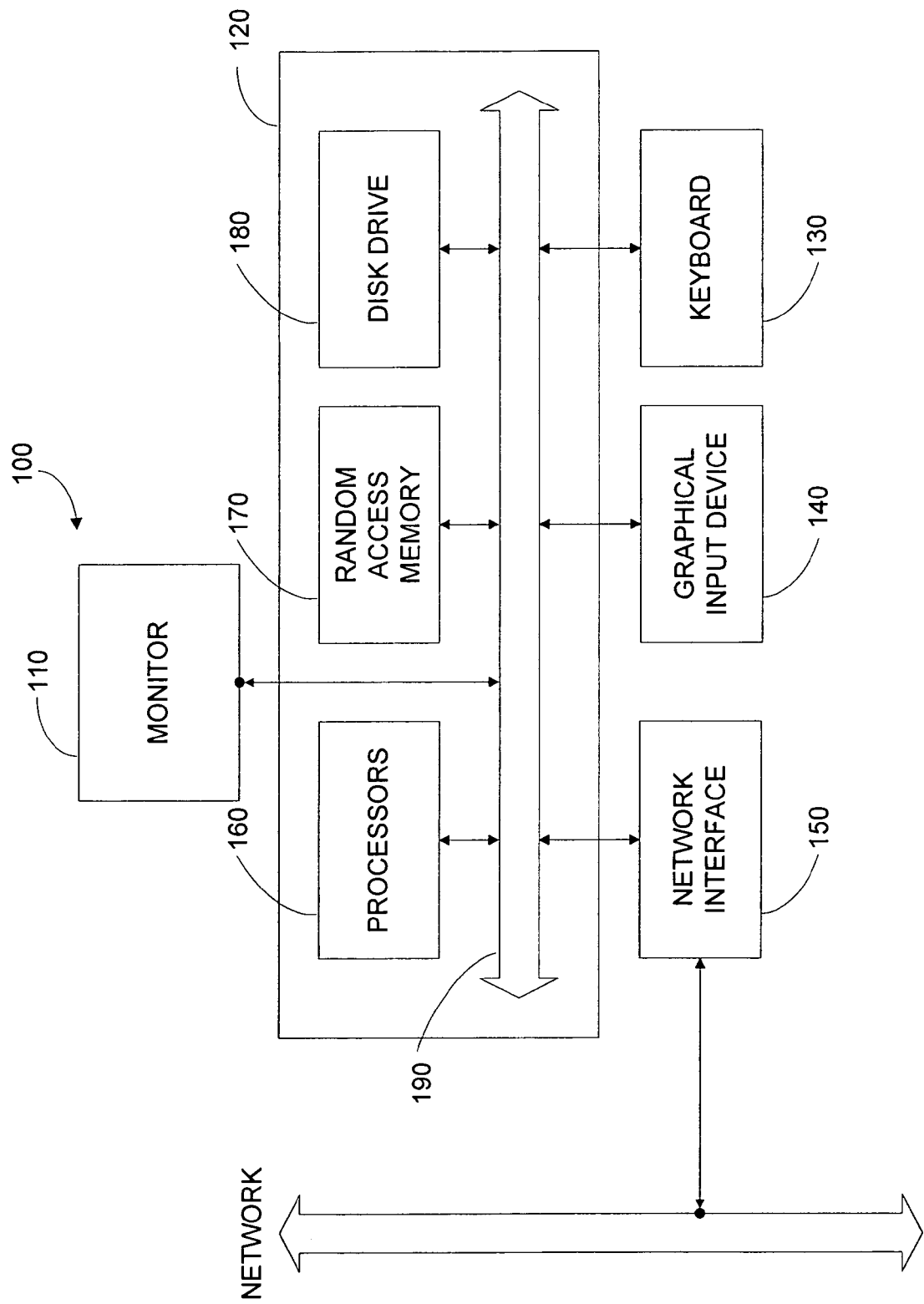
FIG. 1 illustrates a block diagram of a computer system according to one embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text, control points and the like that appear on the monitor 110. In some embodiments, monitor 110 and user input device 140 may be integrated, such as with a touch screen display or pen based display such as a Cintiq marketed by Wacom.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, operating system, embodiments of the present invention, including an asset management system, a database, logical and aggregate assets, object data files, a dependency analyzer, dependency graphs, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer systems capable of embodying the present invention. It will be readily apparent to one of ordinary skill in the art that many other hardware and software configurations are suitable for use with the present invention. For example, the use of other microprocessors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2:
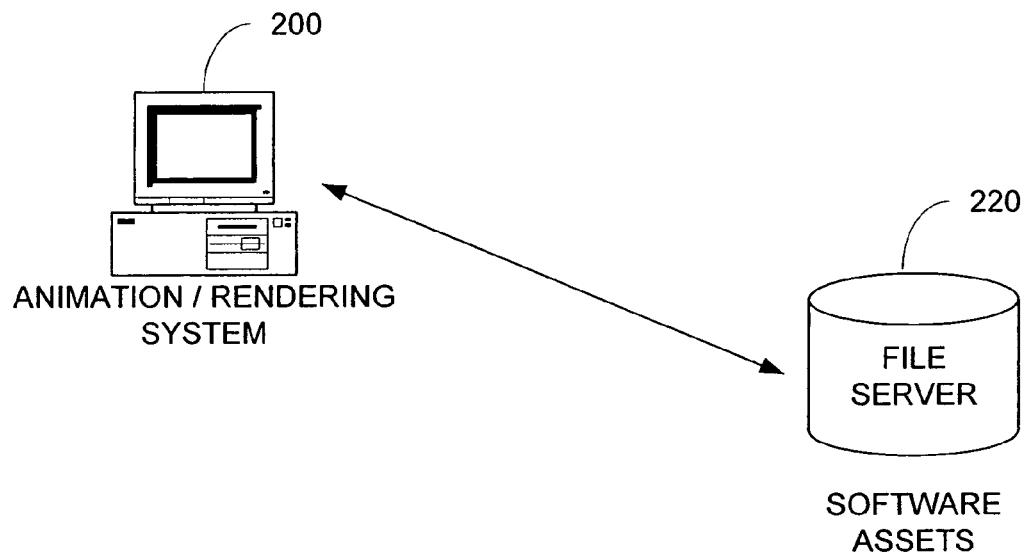
FIG. 2 illustrates a block diagram of an embodiment of the present invention.

FIG. 2 illustrates a block diagram of an embodiment of the present invention. Specifically, FIG. 2 illustrates a computer system 200 and a storage system 210.

In embodiments of the present invention, computer system 200 renders a scene based upon a geometric description of a scene from storage system 220. In embodiments of the present invention, computer system 200 may include one or more computer systems 100. Storage system 220, may include any organized and repeatable way to access the geometric description of a scene including object models, lighting models, camera models, and the like. For example, in one embodiment, storage system 220 includes a simple flat-directory structure on local drive or network drive, or the like. Additionally, locations of object models may be specified by absolute file path locations, relative file paths, aliases, and the like.

In the present embodiment, a geometric scene descriptor is typically a text file that specifies the objects within the scene. Objects include lighting objects, camera objects, geometric objects, and the like. These objects are used to specify the scene for rendering purposes. In the present embodiments, the scene descriptor file also specifies the position of objects in the scene, the orientation of objects, the colors and textures for the objects, properties for objects, and the like. In the present invention, the scene descriptor file is a textual file referred to as a "hook set" or "hook file." A scene descriptor file may be associated with only the frame to be rendered, may be associated with a shot of images, may be associated with a portion of a feature, may be associated with the entire feature, or the like. In other embodiments, other types of representation of a scene descriptor can be used with embodiments of the present invention.

An example of the content of a simple hook file may include the following text references to a camera object, a light object, and a (three-dimensional) object:

hook "camera1" {properties of camera 1};
    hook "light1" {properties of light1};
    hook "object1" {properties of object1};

In one embodiment, for a camera object, properties may include: type of projection (e.g. perspective); field of view; width; position; azimuth; pitch, pan, and roll; aspect ratio; focusing option; cropping; shifting; tv aspect ratio, pan and scan option, number of tracks, number of cranes, and the like. An example of a portion of a camera hook is as follows:

```
hook "main_cam" {
    desc = main_cam: production camera, aka camera01a;
    kind = camera;
    filename = stdobj/Camera01a.m;   (filename of camera model) ...
```

As seen in this example, reference to a file including a specification of a camera model is illustrated as a ".m" file. The .m file is accessed and used when rendering the scene using the camera object. In embodiments of the present invention, other file types for objects are contemplated, such as model files compatible with other three-dimensional creation and manipulation programs, such Maya, SoftImage, or the like.

In another embodiment, for a light object, properties may include: light quality, light type, light shape, light color, and the like. Not all camera objects or light objects need to support the same properties. For example, an "atmospheric fog light" may have a unique fog properties. An example of a portion of a lighting object hook is as follows:

```
hook "LP_Lspt_onPodium" {
    use "stdlight/glight01a/glight01a.hook";
    kind = light;
    class = __Clsss__Glight01a;
    macro = glight01a(name);
    filename = stdlight/glight01a/glight01a.m; (filename of light model)
```

As seen in this example, reference to a file including a specification of a light model is also illustrated as a ".m" file. The .m file is accessed and used when rendering the light object in the scene.

In embodiments of the present invention, geometric objects may include three dimensional descriptions of objects, such as an animated character (e.g. Bob, Marlin, Woody), a prop (e.g. a table, a chair), and the like. Additionally, geometric objects may include virtually any imaginable properties supported. For example, one geometric parameter may be: number of wheels for an automobile object; number of eyeballs for a monster object, or other animation variable, and the like. Additionally, a geometric object may include references to files including physical models. An example of a portion of a geometric object hook is as follows:

```
hook "object1"    {full_model = "object1_full.mdl";
                   number_of_legs = 4;
                     standin_model = "object1_standin.mdl";
                     number_of_legs = 1;
                   ....}
```

In this example, a first geometric description file is specified "object1_full.mdl" and a second geometric description file is also specified "object1_standin.mdl." These respective .mdl files are accessed and used when rendering the geometric object in the scene. In the present embodiment, each model descriptor file is an industry standard .mdl file that specifies how object1 is to be rendered in the scene. In other embodiments, the model descriptor files may include procedurally generated geometric components, procedurally generated textures, and the like for object1. In still other embodiments, combinations of both pre-defined and procedurally generated aspects of object1 may be used.

Further, the .mdl files typically store pre-defined geometric components, shaders, textures, colors, or the like. In embodiments of the present invention, geometric these assets may themselves be aggregate assets, for example, the geometric components may include references to other geometric components, a referenced shader may be an aggregate of other shaders, and the like.

The techniques described above have used representations of objects that are found at "hard coded" or relative computer locations, such as at specific computer disk directories, at specific network directories, with specific file names or aliases, or the like. However, in other embodiments, databases and asset management software may be used to provide the object models.

Figure 3:
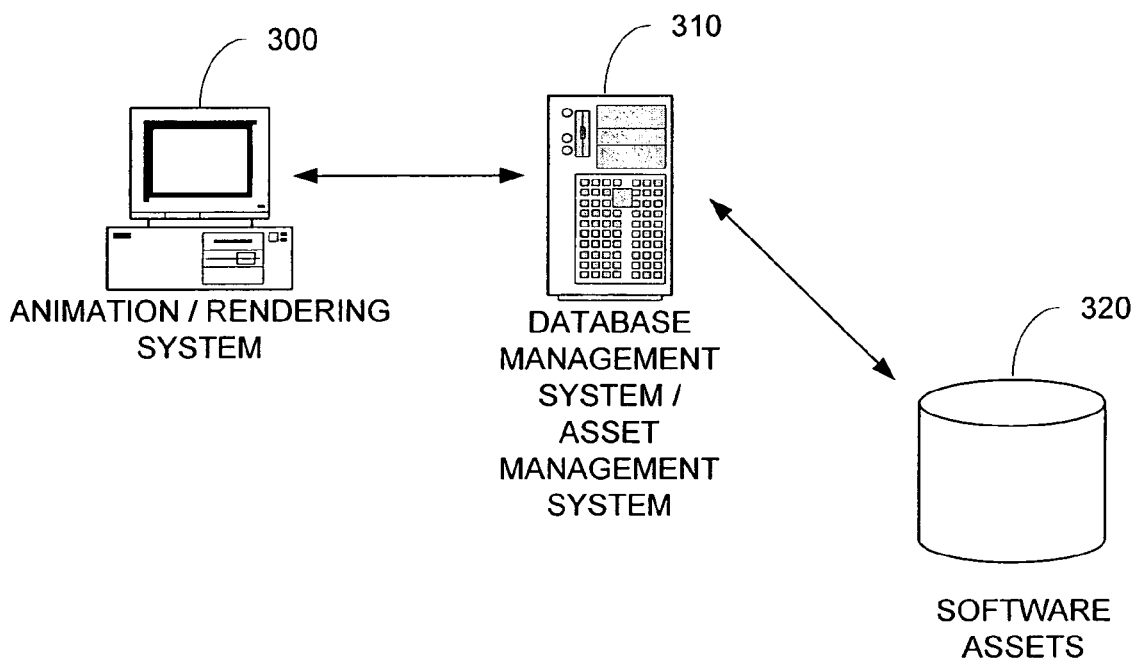
FIG. 3 illustrates another block diagram of an embodiment of the present invention.

FIG. 3 illustrates another embodiment of the present invention. More specifically, FIG. 3 illustrates a computer system coupled to a database.

FIG. 3 includes a computer system 300, a database management system (dbms) 310, and a database 320. In the present embodiment, computer system 300 is a typical rendering system, described above in FIG. 1. Further, database management system 310 and database 320 may be a conventional database systems, available from Oracle, Sybase, or the like.

In the present embodiment, dbms 310 may include conventional database access mechanisms, such as an SQL query tool, or the like. In various embodiment, dbms 310 may include additional front-end software that provides organized access to database 320. In one example, the additional front-end software may include "asset management" software, i.e. software that enables users to more easily store and later retrieve software assets via a structured interface. In embodiments of the present invention, any conventional software asset management system may be adapted to be used.

In operation, computer system 300 may retrieve a scene descriptor file from dbms 310, similar to the above. In this embodiment, the scene descriptor file may simply specify an object name (asset name), specific search terms, a database query, or the like. For example, instead of specifying a filename within a directory, as shown above, the scene descriptor file may specify a series of key search terms to dbms 310. In response, in this example, dbms 310 may use the key search terms to query database 320 and return a specific directory location where the desired object representation may be found. In another example where an asset management system is implemented, the scene descriptor file may also provide the key search terms associated with the desired object.

In response, the asset management system may access database 320, and return the desire object representation.

Embodiments of the present invention can be combined with both of the above file access methods to greatly reduce the amount of work required to manage scenes, especially when object models change or are updated, when new objects are added to the scene, or the like.

Figure 4A:
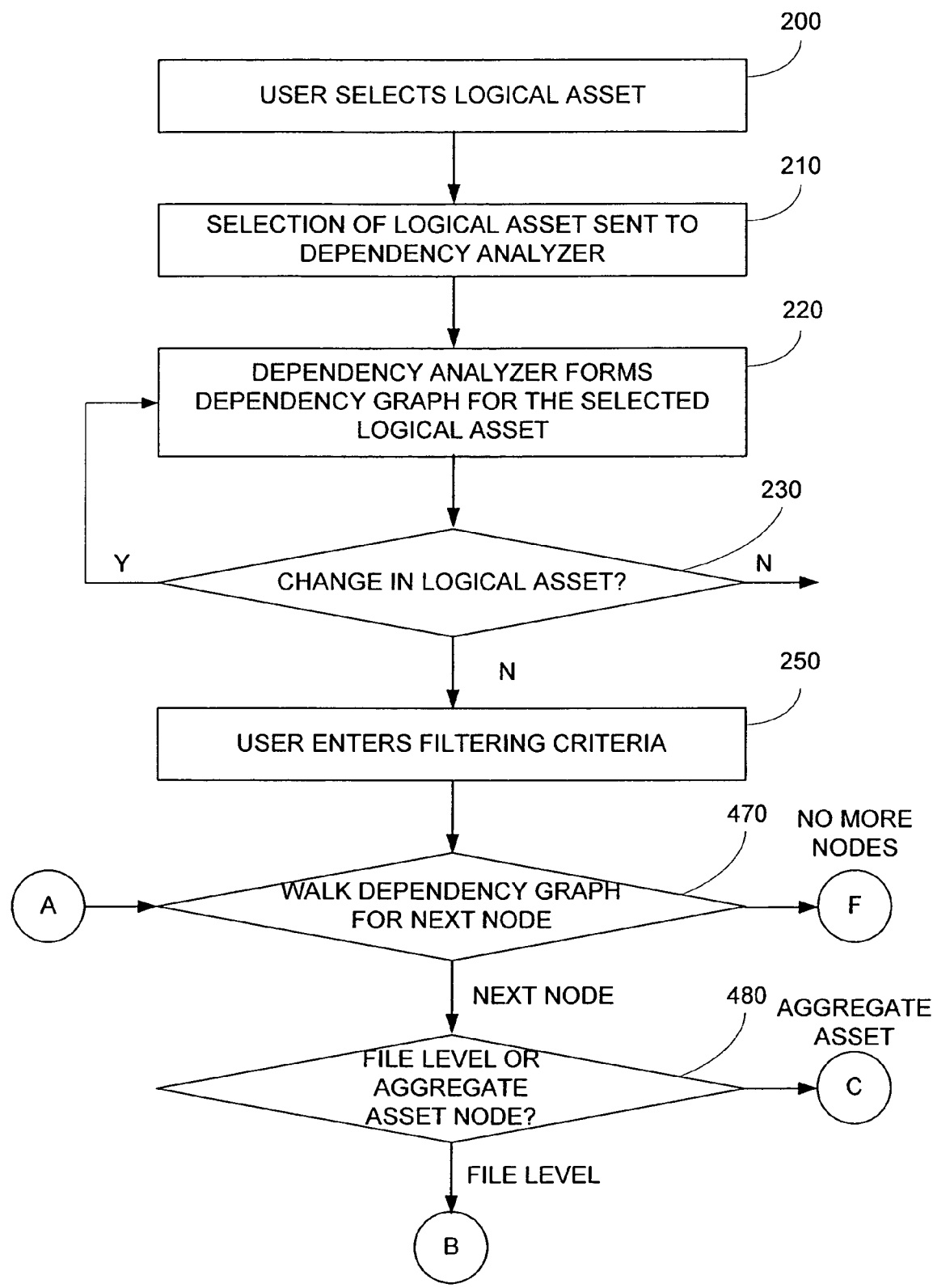
FIGS. 4A-C illustrate a block diagram of a flow process according to an embodiment of the present invention.
Figure 4B:
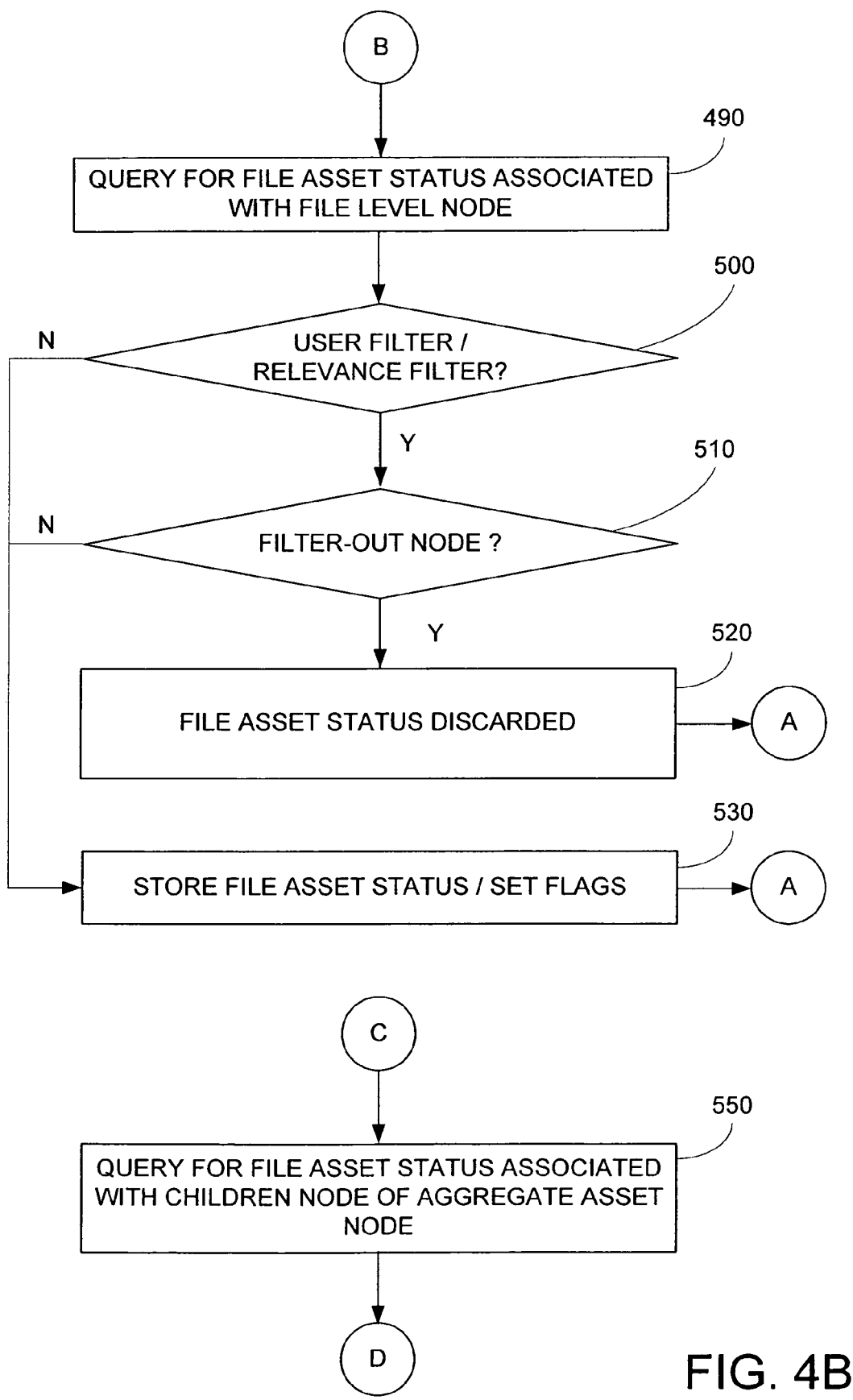
Figure 4C:
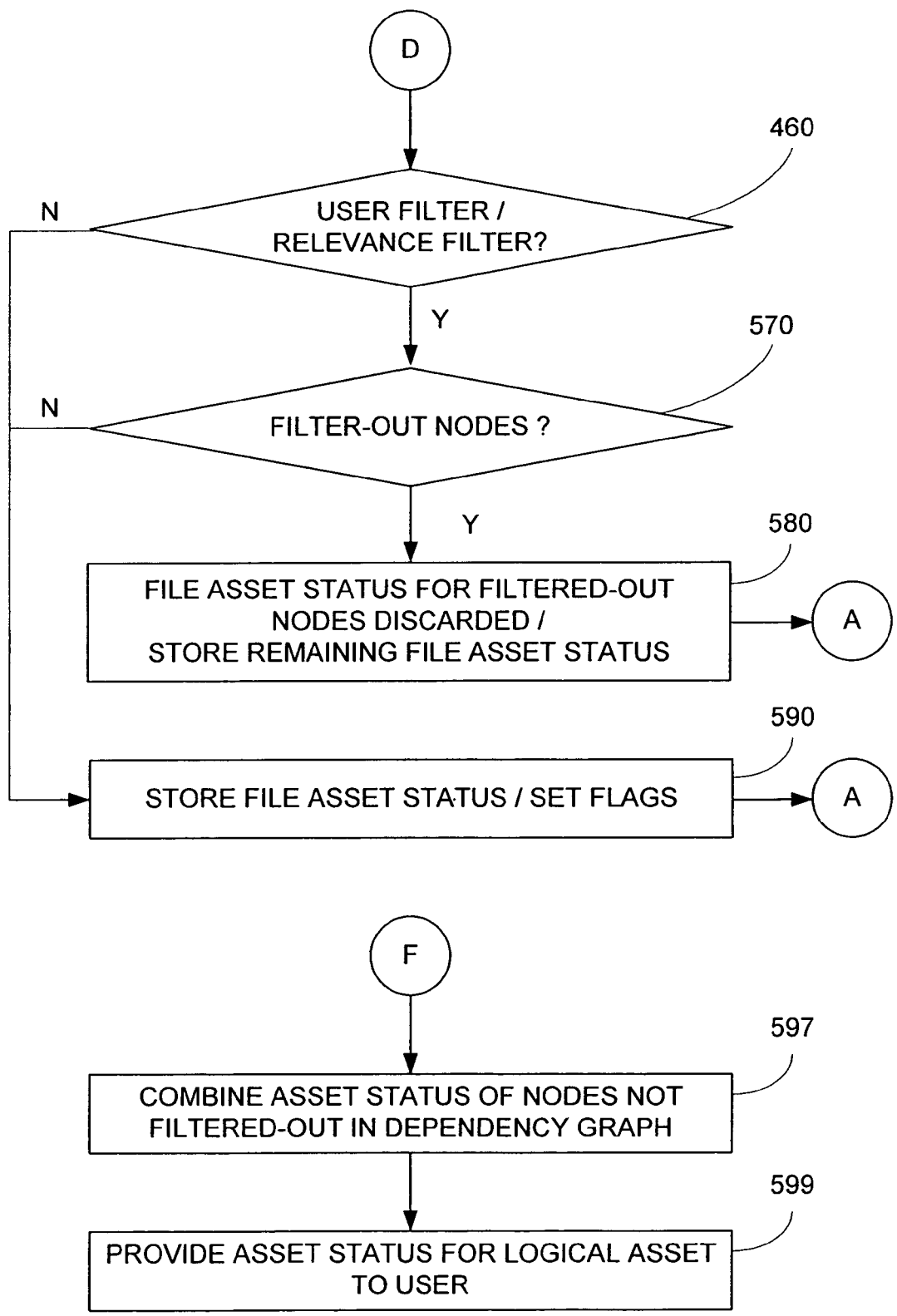

FIGS. 4A-C illustrate a block diagram of a flow process according to an embodiment of the present invention.

Initially, a user selects a logical asset, step 400. This may be performed by the user selecting a logical asset from a list of logical assets presented to the user, or the like. In embodiments of the present invention, a logical asset can be a three-dimensional object such as a character, a prop, etc, the logical asset can be a lighting object or a camera object, the logical asset can be a scene (e.g. a frame), a shot (e.g. a group of related frames), and the like. In embodiments of the present invention, the logical asset is typically a file describing the asset. For example, the file may be a hook set for a scene, a shot, or the like; the file may be a hook set for an object; and the like. In various embodiments, the logical asset may be referenced by a symbolic reference to the hook set file, such as via alias, by a pointer to the hook set file, by an asset management system, and the like.

In the present embodiments, the user requests a status of files making-up the user specified or selected logical asset. Examples of status include, when a file was last updated, a version number of file, who updated a file, the absolute location of a file, a symbolic reference to a file, data required by an asset management system to access a file, a list of changes made to an object, what changes were made to a file, version control data such as version pinning/isolation information for an asset management system, status data stored in an asset management system, change isolation data, on-disk status, user information, access time(s), file type, file size, user notes, and the like. Many other types of data are contemplated.

In the present embodiments, a reference to the logical asset is sent to a dependency analyzer, step 420. In various embodiments, the dependency analyzer may or may not be on the same server as the rendering server or database. As discussed above, a reference to the logical asset may be referenced via file name, symbolic reference, via a file management system (asset management system), and the like. In various embodiments, a file, such as a textual hook set file is retrieved. As illustrated in the example above, the hook set file typically includes references to other files (e.g. hook files).

In response to the selection of the logical asset, the dependency analyzer performs an analysis on the selected logical asset to form a dependency graph, step 430. In the present embodiments, in each dependency graph, each leaf node represents a file, each branch node represents a logical asset composed of underlying leaf nodes, and the root node represents the specified logical asset as selected by the user. An example of this is illustrated below.

FIGS. 5A-B illustrate an example according to an embodiment of the present invention. In FIG. 5A, a user specified logical asset, object 600, is illustrated having a head 610, arms 620, body 630, and legs 640. A possible representation for object 600 is given below:

```
hook "object1"    {head_model = "head.mdl";
                   body_model = "body.mdl";
                   arm_model = "arm.mdl"; number_of_arms = 2;
                   leg_model = "leg.mdl"; number_of_legs = 2;
                   ....}
```

In FIG. 5B, a dependency graph 650 is illustrated. In this example, root node 660 represents object 600, and each node 670 represents a leaf node corresponding to head 610, arms 620, body 630, and legs 640, respectively.

FIGS. 6A-B illustrate another example according to an embodiment of the present invention. In FIG. 6A, a user selected logical asset, object 700, is illustrated having a head 710, arms 720, body 730, and legs 740. Additionally, the aggregate asset, head 710, includes eyes 715 and mouth 750. A possible representation for object 700 is given below:

```
hook "object2"   {head_model = "head";
                  body_model = "body.mdl";
                  arm_model = "arm.mdl"; number_of_arms = 2;
                  leg_model = "leg.mdl"; number_of_legs = 2;
                  ....}
```

In this example, the head model is an "aggregate asset" that is described in another hook file:

```
   hook "head "   {face_model = "face.mdl";
                   eye_model = "eye.mdl"; number_of_eyes = 1;
                   ....}
```

In this example, the head model is an aggregate asset as it is made-up of other models: a face model and an eye model.

In FIG. 6B, a dependency graph 760 is illustrated. In this example, root node 770 represents object 700, and node 780 represents a leaf node corresponding to arms 720, body 730, and legs 740, respectively. Additionally, node 790 represents a branch node for the aggregate asset head 710. Further, nodes 800 and 810 represent leaf nodes corresponding to eyes 715 and mouth 750, respectively.

In other examples, logical assets may be made-up of multiple levels of aggregate assets, recursively. In the present embodiments, aggregate asset are eventually resolved to physical assets, such as object model files, camera model files, lighting model files, texture files, and the like. In other embodiments of the present invention, he dependency graph may also be based on information form other sources than the scene descriptor file, such as structural information (e.g. disk location), asset references mined from a database, and the like.

Returning to the description of the embodiments in FIGS. 4A-C, if a file or an aggregate asset is changed, the dependency graph is redetermined, step 440, using the process described above. In the present embodiment, re-determination is performed upon change of the file or asset. Additionally, the re-determination may be performed upon user query of the logical asset status, at particular times of the day, upon occurrence of other type of event, or the like.

Next, the user may enter one or more filtering criteria, step 450. In the present embodiment, the filtering criteria is used to filter-out status of assets/files that are not required by the user. For example, a user who is concerned about the placement of new objects (e.g. props) in a scene. In such an example, when the user runs a simulation file (rendering for test purposes), the user would not be as concerned as to what changes to lighting objects have been made to the same scene. In such an embodiment, the user would thus specify filtering criteria to exclude lighting object assets from the status report. In another embodiment, an animator may be concerned with character movement and not necessarily prop placement, accordingly, changes to objects other than the character in the scene are not as important. In another example, the user may be interested in what changes were made to the logical asset within a time period, e.g. today. In other embodiments of the present invention, filtering criteria may be pre-defined for specific users, accordingly, users need not specify filtering criteria for each logical asset query.

Many types of status data may be provided with embodiments of the present invention. Additionally, parameters for such status data may also used for filtering. Examples of additional status data includes filtering upon object base type (e.g. model, shader, etc); object conceptual type (e.g. character, light, camera, etc.); relevant corporate department (e.g. lighting department, animation department, etc.); user name; date of modification; asset lock status (e.g. locked/unlocked/not under revision control); change isolation status (e.g. pinned, unpinned, not under change isolation); pipeline status (e.g. modeling is finished, shading is expected in 3 weeks); and the like.

In embodiments of the present invention, filters may include Boolean and other types of expression operations upon asset status parameters, asset user comments, or other data associated with an asset.

In various embodiments of the present invention, relevance-weighted filtering is performed. For example, for a user, the status of "important" lighting object assets are reported to the user, such as the status of ambient lighting sources, but not the status of less "important" lighting assets, such as spotlight sources. In another embodiment, animator filters out unimportant shading data but receives status data about character models and articulation (rig) changes for a given model.

In the present embodiment, the dependency graph is then walked from the logical asset root node on down, step 470. As described above, nodes may be file-level asset node, that is, nodes that are associated with a physical file or an aggregate asset node, that is, a node including one or more file-level asset node, step 480. For example, referring to the example in FIG. 5A, nodes 670 are examples of file-level asset nodes because each node is associated with a physical *.mdl file name. In various embodiments, the physical file (e.g. *.mdl) may be retrieved from an asset management system instead of directly with a file name. In the example in FIG. 5B, branch node 790 is an example of an aggregate asset that includes leaf nodes 800 and 810, each associated with physical files.

In embodiments where a node is a file-level asset node, the system then queries for the asset status, step 490. For example, the status may include a version number, changes, disk status, user information (e.g. who touched a file, who last edited a file), version pinning information, access time, file type, and the like. Additionally, any textual status notes entered by users may be returned. In various embodiments, the status information may be stored in a file associated with the file-level asset node, may be found in a version control or change isolation system, in another type of asset management system, and the like. Additionally, other types of information may be associated with the asset by adding objects including analysis methods and other storage fields. Predetermined asset status information may be returned in some embodiments, whereas in other embodiments, the user may specify the type of asset status information desired.

In embodiments of the present invention, if a filter or user refinement is specified in step 450, step 500, a determination is made typically upon the asset status data determined in step 490, whether to omit the node status or not, step 510.

In the case where a node is to be filtered-out, the status data for the node is discarded, and the dependency graph returns to the parent node, step 520. Otherwise, one or more flags may be set indicating that the status of this asset is to be reported, additionally, the status information for this node is stored, step 530. In embodiments of the present invention, the flags can be set using Boolean or regular expression operation on the status data, or the like. In one embodiment, the status information may be appended to a status file for the logical asset.

In embodiments where a node is an aggregate asset node (e.g. branch node), the status is derived from the child leaf nodes, step 550. For example, the status of a branch node is typically the combination of the status of the file-level assets (leaf nodes). As another example, the status of a branch node including child branch nodes typically includes the status of the leaf nodes of the child branch nodes. In the present embodiment, the process of determining the status of aggregate assets is recursive, until file-level assets are determined. In other embodiments, the status of branch nodes may be pre-determined and stored.

In embodiments of the present invention, the filter or user refinement specified in step 450 may also be applied to the file-level assets making-up an aggregate asset, step 560. A determination is made typically upon the asset status data for each file-level asset in the aggregate asset whether to omit the node status or not, step 570. In the case where a node is to be filtered-out, the status data for the file-level node is discarded from the status of the aggregate asset, step 580. Otherwise, one or more flags may be set indicating that the status of this asset is to be reported, and the status information for this aggregate asset node is then stored, step 590. In one embodiment, the status information may be appended to a status file for the logical asset.

The status information for the file-level nodes and the aggregate asset nodes are then combined, step 597 and provided to the user, step 599. In one embodiment, the status information may be provided in a flat file, an e-mail, stored in a database, web page output, or the like. In other embodiments, the status information may be presented in a graph-based representation of the dependency graph, where a user can click on leaf nodes and branch nodes to obtain the status information of the underlying leaf nodes, if any.

Many changes or modifications are readily envisioned. In light of the above disclosure, one of ordinary skill in the art would recognize that many variations may be implemented based upon the discussed embodiments. In embodiments of the present invention, status data may be associated with file-level nodes as well as aggregate asset nodes. For example, in FIG. 6B, status data for object 700 is derived from leaf-nodes 780, 800 and 810. In addition status data may be associated with branch node 790, and branch node 770. For instance, additional status data associated with branch node 770 may include version number of object 700, who "owns" object 700, what organizational group object 700 belongs to (e.g. animation, lighting, shading), and the like.

In embodiments of the present invention, the status data may be retrieved from multiple sources. For example, the status data may be retrieved from a revision control asset management system, from a database management system, an asset database, an on-disk file structure, a hook files, a model catalog file (e.g. an .mcat file), a revision control system, logfiles, change isolation system files and the like.

In embodiments of the present invention, a "catch" file is also provided in within specific directories associated with file-level assets and aggregate assets. The catch file is used to store textual information about the asset that may or may not be stored within a revision control system, database, or the like. For example, such data may include a description of dialog in the scene, deadlines for the scene, scene number, user comments (e.g. director, animator, shader, lighter), description of the asset type (e.g. lighting object, character object, camera object), description of changes between revisions, contact information of "owners" of the asset, convenience data (e.g. asset type, asset database key name, change isolation status, etc.) for quick reference; user comments not in the database, information about other aggregate assets that have incorporated the aggregate asset (e.g. represented by a particular directory in their graph), and the like. In light of the present disclosure, on of ordinary skill in the art would recognize that many other types of information can be stored in the asset management system, database, catch file, and the like.

It should be understood that "rendering" may refer to a high quality process of converting an image from a mathematical description of a scene using a program such as RenderMan®. Environments such as Mental Ray by Mental Images may also be adapted with the innovations described herein. Additionally, "rendering" may refer to any graphical visualization of the mathematical description of the scene, or any conversion of geometry to pixels, for example "rendering" with a lower quality rendering engine, or the like. Examples of low-quality rendering engines include GL and GPU hardware and software renderers, and the like In some embodiments of the present invention, single or multiple representations of objects are contemplated within a hook set. For example, an object may include a complex model and a simple model for various rendering purposes. In such embodiments, the user may specify which model is desired for status reporting, and/or one model may be selected as a default object model. In other embodiments, if neither model is specified, both may be represented in the dependency graph, and reported.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprises:
   receiving selection of an aggregate asset from a user;
   determining a dependency graph for the aggregate asset comprising a plurality of nodes;
   determining node types for the plurality of nodes;
   when a first node of the plurality of nodes comprises a file-level asset node, the method includes determining first status data associated with the first node;
   when a second node of the plurality of nodes comprises an aggregate asset node, the method includes:
      determining a plurality of file-level asset nodes that are children nodes of the aggregate asset node; and
      determining status data associated with each of the plurality of file-level asset nodes;
   aggregating the first status data and the status data associated with the plurality of file-level asset nodes to form status data for the aggregate asset; and
   providing the status data for the aggregate asset to the user.

2. The method of claim 1 wherein the aggregate asset comprises a logical asset selected from a group consisting: a three-dimensional object associated with a character, a three-dimensional object associated with a prop, a scene comprising a plurality of related images, a shot comprising a plurality of related scenes.

3. The method of claim 1 wherein the aggregate asset comprises a hook set file including references to a plurality of assets.

4. The method of claim 3 wherein the hook set file comprises references to a plurality of files.

5. The method of claim 3 wherein the references are selected from the group consisting of: symbolic references, aliases, references to an asset management system, file name, file directory.

6. The method of claim 1 wherein the status data for the aggregate asset includes data selected from the group consisting of: when an asset was last updated, who updated the asset, what changes were made to the asset, what is the latest version of the asset.

7. The method of claim 1
wherein the plurality of nodes includes a third node;
wherein the third node is associated with additional status data; and
wherein the method further comprises:
  receiving restriction criteria from the user; and
  providing the additional status data to the user when the additional status data fulfills the restriction criteria.

8. A computer program product for a computer system comprises:
  code that directs the processor to receive a selection of an aggregate asset from a user;
  code that directs the processor to determine a dependency graph for the aggregate asset, wherein the dependency graph comprises a plurality of nodes;
  code that directs the processor to determine whether nodes from the plurality of nodes are file-level nodes;
  code that directs the processor to determine first status data associated with a first node, when the first node is a file-level node;
  code that directs the processor to determine more than one file-level nodes associated with the first node, when the first node is not a file-level node;
  code that directs the processor to determine first status data associated with the first node in response to status data associated with the more than one file-level nodes; and
  code that directs the processor to provide the status data for the aggregate asset to the user in response to the first status data;
  wherein the codes reside on a tangible media.

9. The computer program product of claim 8 wherein the aggregate asset comprises a logical asset selected from a group consisting: a three-dimensional object, a prop, a plurality of related images, a plurality of related scenes, shader data, texture data.

10. The computer program product of claim 8 wherein the aggregate asset comprises a file including references to a plurality of files.

11. The computer program product of claim 10 wherein the references are selected from the group consisting of: symbolic references, aliases, references to an asset management system, file name, file directory.

12. The computer program product of claim 8 wherein the status data for the aggregate asset includes data selected from the group consisting of: when an asset was last updated, who updated the asset, what changes were made to the asset, what is the latest version of the asset, ownership of the asset, shaders referenced, textures referenced, sub-aggregate assets referenced.

13. The computer program product of claim 8 wherein the status data associated with the more than one file-level nodes are received from a data source selected from the group consisting of: asset management system, database management system, text file.

14. The computer program product of claim 8 wherein the first status data associated with the first node is determined in response to status data associated with the first node and in response to status data associated with the more than one file-level nodes.

15. A computer system comprises:
  a memory configured to store a representation of a logical asset, wherein the logical asset comprises a plurality of assets;
  a processor coupled to the memory configured to receive selection of the logical asset from a user, wherein the processor is configured to determine a dependency graph for the logical asset comprising a plurality of nodes, wherein the processor is configured to determine node types for the plurality of nodes, wherein the processor is configured to determine first status data associated with a first node from the plurality of nodes when the first node is a file-level node, wherein the processor is configured to determine a plurality of file-level asset nodes for a second node from the plurality of nodes and configured to determine status data associated with each of the plurality of file-level asset nodes when the second node of the plurality of nodes is an aggregate asset node, wherein the processor is configured to aggregate the first status data and the status data associated with the plurality of file-level asset nodes to form status data for the logical asset, and wherein the processor is configured to provide the status data for the logical asset to the user.

16. The computer system of claim 15 wherein the logical asset comprises a logical asset selected from a group consisting: a geometric description of a three-dimensional object, a geometric description of a scene, a geometric description of a shot of images.

17. The computer system of claim 15
wherein the logical asset comprises references to a plurality of logical assets and references to file-level assets; and
wherein a first set of nodes from the plurality of nodes are associated with file-level assets.

18. The computer system of claim 17 wherein a second set of nodes from the plurality of nodes are associated with aggregate assets.

19. The computer system of claim 15 wherein the status data for the logical asset includes data selected from the group consisting of: when an asset was last updated, who updated the asset, what changes were made to the asset, what is the latest version of the asset.

20. The computer system of claim 15 wherein the computer system further comprises an asset management system configured to provide the processor with access to the memory.

* * * * *

UNITED STATES PATENT AND TRADEMARK OFFICE
CERTIFICATE OF CORRECTION

PATENT NO.       : 7,580,986 B2                                      Page 1 of 1
APPLICATION NO.  : 10/947074
DATED            : August 25, 2009
INVENTOR(S)      : Stephan Vladimir Bugaj It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1373 days.

Signed and Sealed this

Fourteenth Day of September, 2010

David J. Kappos
*Director of the United States Patent and Trademark Office*